United States Patent [19]
Bopp

[11] 3,831,378

[45] Aug. 27, 1974

[54] HYDROKINETIC COUPLING SLEEVE SEAL

[75] Inventor: Warren G. Bopp, Farmington, Mich.

[73] Assignee: Eaton Corporation, Cleveland, Ohio

[22] Filed: June 25, 1973

[21] Appl. No.: 373,201

[52] U.S. Cl. .................................. 60/353, 60/366
[51] Int. Cl. .......................................... F16h 41/04
[58] Field of Search ...................... 60/330, 352, 353

[56] References Cited
UNITED STATES PATENTS

| | | | |
|---|---|---|---|
| 3,572,480 | 3/1971 | Nagel | 60/353 X |
| 3,756,028 | 9/1973 | Bopp et al. | 60/353 |

Primary Examiner—Edgar W. Geoghegan
Attorney, Agent, or Firm—Teagno & Toddy

[57] ABSTRACT

A hydrokinetic coupling of the toroidal fluid flow type having an impeller member and a turbine member. The impeller member has a radially inwardly facing trough positioned radially outward of the turbine member which has a radially outwardly facing trough. The troughs together form a toroid of substantially elliptical cross section. A plurality of mutually facing stepped blades circumferentially disposed in the impeller and turbine member troughs define a stepped annular gap between the members. The gap is generally Z-shaped and includes two gap portions parallel to the rotational axis of the members radially offset by a third gap portion transverse to the rotational axis. An annular core guide ring is disposed in the transverse gap portion and secured to the impeller blades; this ring cooperates with a cylindrical sleeve, which is selectively movable into one of the offset gaps, to control fluid circulation between the impeller and the turbine. An annular split seal, carried by a portion of the impeller member, cooperates with the cylindrical sleeve to prevent fluid leakage from the impeller when the cylindrical sleeve is fully inserted into the offset gap and seated against the core guide ring.

9 Claims, 4 Drawing Figures

HYDROKINETIC COUPLING SLEEVE SEAL

FIELD OF THE INVENTION

This invention relates generally to torque control of hydrokinetic devices and specifically to control of fluid circulation in such devices.

DESCRIPTION OF THE PRIOR ART

Hydrokinetic coupling devices of the toroidal fluid circulation type are well known in the prior art and have been of two basic designs. The first and most popular design, such as disclosed in U.S. Pat. Nos. 2,096,071 and 2,267,852, includes two axially facing, annular trough members of semicircular cross section; each trough has radially disposed blade sets which define a radially extending gap between the members. The second design, such as disclosed in U.S. Pat. No. 3,572,480, includes two radially facing annular trough members of semicircular cross section; each trough has radially disposed blade sets which define an axially extending gap between the members.

The coupling designs in the mentioned patents disclose torque control means to regulate the amount of kinetic energy transmitted or dissipated. Coupling torque control in U.S. Pat. No. 2,096,071 is regulated by a cylindrical sleeve which may be inserted in an axially extending slot in one of the annular trough members to throttle fluid circulation. Coupling torque control in U.S. Pat. No. 2,267,852 is regulated by sluice gates which may be inserted in the radially extending gap between the two annular trough members. Coupling torque control in U.S. Pat. No. 3,572,480 is regulated by a cylindrical sleeve which may be inserted in the axially extending gap between the two annular trough members.

Whereas these prior art torque control means can effectively block all direct fluid circulation between the trough members, indirect fluid circulation, caused by fluid leakage from the driven trough member, continues, thereby transmitting torque to the output member and dissipating energy in the coupling when neither is wanted.

SUMMARY

An object of this invention is to provide a hydrokinetic coupling having superior torque control.

A more specific object of this invention is to provide a hydrokinetic coupling having torque regulation control capable of reducing transmitted torque to very low levels attributable to viscous drag.

Another object of this invention is to provide a hydrokinetic coupling having torque control capable of reducing energy dissipation in the coupling to very low levels attributable to viscous drag.

The hydrokinetic coupling of this invention includes two annular trough members which define a toroidal fluid chamber, blade sets disposed in the troughs which define a gap between the troughs, and means slideable into the gap to block fluid circulation between the troughs.

According to an important feature of the invention a seal cooperates with the blocking means and one of the trough members, thereby preventing all fluid circulation in at least one of the troughs when the blocking means is fully inserted in the gap.

In the disclosed embodiment of the invention the gap between the annular trough members is generally Z-shaped and the means to block fluid circulation between the troughs is a cylindrical sleeve which, when inserted in an axially extending portion of the Z-shaped gap, cooperates with a core guide ring in a vertical extending portion of the Z-shaped gap to block all direct fluid circulation between the troughs.

The seal cooperates with the driven trough member and the sleeve to block fluid leakage from the driven trough, thereby preventing all fluid circulation in the troughs.

The disclosure of the present application is substantially identical to the disclosure of copending U.S. Application Ser. No. 245,417 now U.S. Pat. No. 3,756,028, granted Sept. 4, 1973.

BRIEF DESCRIPTION OF DRAWINGS

A preferred embodiment of the invention is shown in the accompanying drawings in which.

DESCRIPTION OF THE PREFERRED EMBODIMENT

Figure 1:
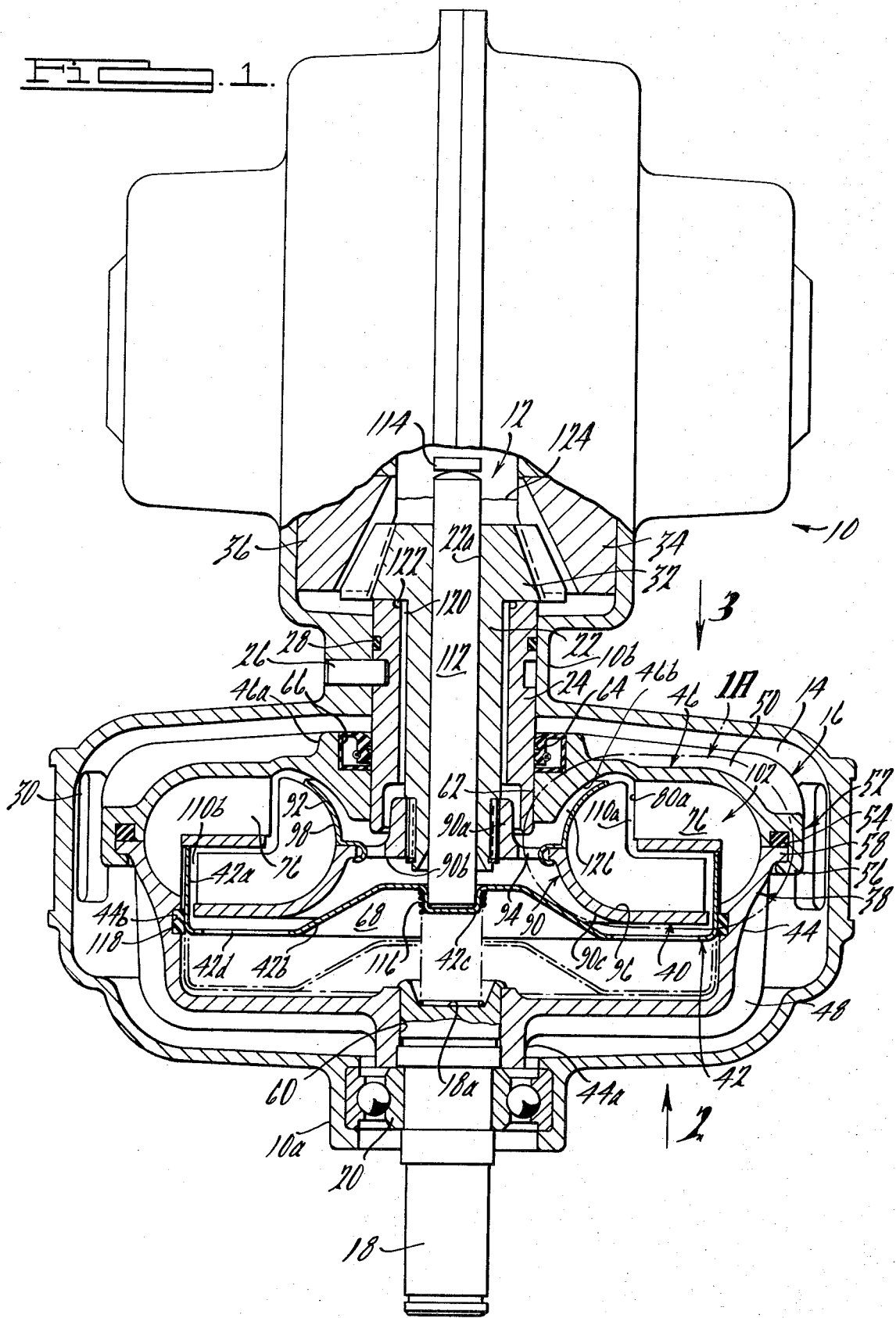
FIG. 1 is a fragmentary view of a transmission embodying a hydrokinetic coupling according to the invention.

Referring first to FIG. 1, the transmission seen in FIG. 1 includes a transmission housing 10 of somewhat hourglass shape defining a gear chamber 12, shown in partial section, and a hydrokinetic coupling chamber 14, shown in full section. A hydrokinetic coupling 16 is mounted for rotation within chamber 14.

Coupling 16 includes an input shaft 18 journaled in a ball bearing 20 mounted in a hub portion 10a of housing 10, and an output shaft 22 journaled in a sleeve bearing 24 positioned within neck portion 10b of housing 10. Sleeve bearing 24 is secured by a pin 26 and sealed about its periphery by an O-ring 28. A plurality of openings 30 circumferentially spaced around the periphery of chamber 14 allow circulation of cooling air into and out of the chamber. A bevel gear 32 fixed to and driven by output shaft 22 is in constant mesh with a pair of load driving gears 34, 36 which may be engaged or disengaged with a load (not shown). The gearing contained in chamber 12, which is only partially shown, may be of any conventional type and is mentioned here merely as an example of a means for connecting the coupling output to a load.

The coupling 16 comprises an impeller member 38, a turbine member 40, and a cylindrical control sleeve 42.

Impeller 38 comprises a lower cup-shaped member 44 and a lid member 46. The exterior surfaces of members 44, 46 have formed thereon a plurality of cooling fins 48, 50 for dissipating heat produced by coupling 16. Members 44 and 46 are joined and sealed circumferentially at 52. Joining and sealing may be accomplished in any of several well known ways; herein sealing is provided by an O-ring seal 54 and joining by rolling an edge 56 of member 46 over a lip 58 of member 44. Members 44, 46 when joined rotate as a single unit in response to rotation of input shaft 18 which is press-fitted into an aperture 60 in a hub portion 44a of impeller 38. Ball bearing 20, in addition to providing the lower journal for impeller 38 also provides vertical support for the impeller. Journaling of the lid member 46 of the impeller is provided by an aperture 62 in a hub portion 46a of member 46 which receives a downward projection of sleeve bearing 24. A seal 64, press-fitted into a counter bore 66 in hub portion 46a, provides a fluid seal between a fluid chamber 68, defined within impeller 38, and coupling chamber 14.

Figure 1A:
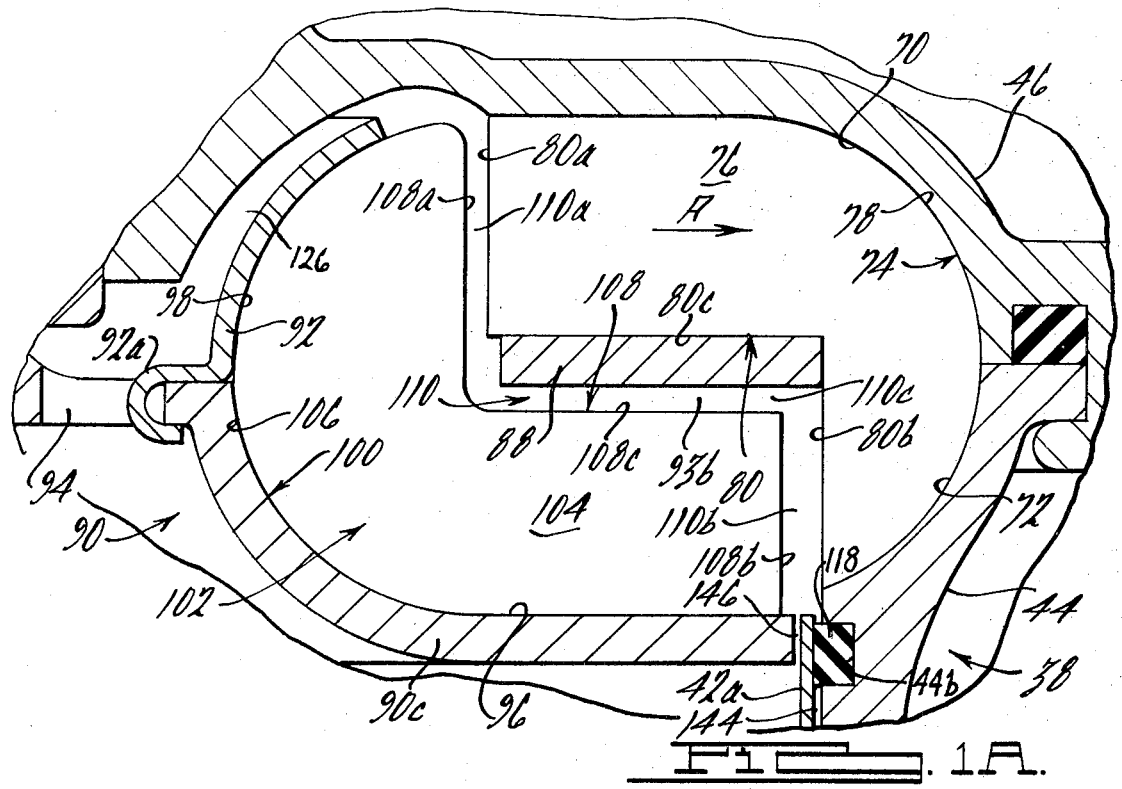
FIG. 1A is an enlarged view of the portion of the hydrokinetic coupling of FIG. 1 seen within the elliptical dash and dot outline 1A of FIG. 1.

Looking now at FIG. 1A and the interior of impeller member 38, a pair of smooth, curved surfaces 70, 72 formed respectively on the interior walls of housing members 46, 44 coact to define a radially inwardly facing trough 74. A plurality of fluid directing impeller blades 76, having curved outer edges 78 and stepped inner edges 80, are circumferentially spaced in trough 74 (see FIG. 2). Blades 76 may be integrally formed with member 46, such as by casting, or attached in any of several well known manners. The portion of curved edge 78 lying adjacent to surface 72 fits snugly thereagainst and is preferably unattached to simplify assembly. The stepped edges 80 are each formed by two edge portions 80a, 80b which are parallel to the axis of shaft 18 and separated by a third edge portion 80c which is perpendicular to edges 80a, 80b. An annular core guide ring 88 is snugly fixed to the edges 80c of blades 76.

Referring again to FIG. 1, the turbine member 40 includes a turbine wheel 90 and a shroud 92. Wheel 90 includes a splined hub portion 90a press-fitted on the lower end of shaft 22, a radially outwardly extending flange portion 90b having a plurality of circumferentially spaced holes 94 therein, and a further radially outwardly extending portion 90c. Referring now to FIG. 1A, outwardly extending portion 90c has a smooth, curved surface 96 facing surface 70 and of substantially the same cross-sectional shape. Shroud 92 has a smooth curved surface 98 facing surface 72 and of substantially the same cross-sectional shape. Shroud 92 has a plurality of downwardly projecting tabs 92a which pass through holes 94. Shroud 92 is secured to turbine wheel 90 by bending the tabs as shown. Curved surfaces 96, 98 together define a radially outwardly facing trough 100 which, together with impeller trough 74, defines a toroidal fluid working chamber 102 having a substantially elliptical cross-sectional shape. A plurality of fluid directing turbine blades 104 are circumferentially spaced in trough 100 (see FIG. 3). Blades 104 have curved edges 106, which coincide with the cross-sectional shape of trough 100, and stepped edges 108 facing the stepped edges 80 of blades 76 and defining therebetween an annular stepped gap 110. Blades 104 may be integrally formed with turbine wheel 90, such as by casting, or attached in any of several well known manners. The portion of curved edges 106 lying adjacent to surface 98 fits snugly thereagainst. The stepped edges 108, like stepped edges 80, are formed by two edge portions 108a, 108b which are parallel to the axis of the shaft 22 and separated by a third edge portion 108c which is perpendicualr to edges 108a, 108b. Edges 80a, 108a are mutually facing and spaced apart to provide a running annular clearance gap 110a therebetween comprising a parallel portion of stepped gap 110. Edges 80c, 108c are mutually facing and spaced apart to provide an annular gap 110c comprising a perpendicular portion of stepped gap 110; gap portion 110c is large enough to allow running clearance between edges 108c and core guide ring 88. Edges 80b, 108b are also mutually facing and spaced apart to provide an annular gap 110b comprising a parallel portion of stepped gap 110; gap portion 110b is large enough to allow insertion of cylindrical control sleeve 42 as shown in FIG. 1.

Referring again to FIG. 1, cylindrical control sleeve 42 includes a sleeve portion 42a and a flange portion 42b. Sleeve portion 42a has an inner diameter which is slightly greater than the innermost diameter of annular gap portion 110b and an outer diameter which is slightly less than the outermost diameter of gap portion 110b. Flange portion 42b includes a central hub portion 42c which is fitted over the lower end of a control shaft 112 slideably positioned in a central bore 22a in output shaft 22. Shaft 22 thus supports sleeve portion 42a in a position of axial alignment with gap portion 110b. Circulation of reservoir fluid between the area above and below flange portion 42b is provided by a plurality of circumferentially arrayed openings 42d in the outer peripheral portion of flange 42b. A positionable control arm 114, shown in end view only and in its uppermost position, is located at the other end of shaft 112. When arm 114 is as shown, sleeve portion 42a is fully inserted into gap 110b and seated against core guide ring 88 by the biasing force of a coil spring 116 fitted at its upper end over hub portion 42c and received at its lower end in central recess 18a in the upper end of shaft 18. Sleeve portion 42a may be fully withdrawn from gap portion 110b, as represented by the broken line position of FIG. 1 and the solid line position of FIG. 1A, or intermediately positioned within gap 110b by selectively positioning arm 114. The arm may be controlled in any of several well known ways; herein the arm is fixed to a shaft, not shown, which is manually rotated by an operator.

A seal 118 is fitted in an annular groove 44b to seal the annular area between sleeve portion 42a and the wall member 44. Seal 118 may be made of any of several well known materials such as rubber, nylon, Teflon, metal, etc. During developemnt of the coupling a split nylon seal was used; this type of seal provided low frictional forces between the seal and sleeve portion 42a and adequate sealing over the operating temperature and pressure range of the coupling. As an alternative to seal 118, the area between wall member 44 and sleeve portion 42a may be made small by close tolerance control of the wall and sleeve.

A plurality of interconnecting pairs of channels 120, 122 formed respectively in the inner periphery and top end of sleeve bearing 24 allow fluid communication between fluid chamber 68 and gear chamber 12. Channels 122 extend tangentially outwardly from the inner diameter of sleeve bearing 24. Chamber 68 and the lower portion of gear chamber 12 together form a fluid reservoir, which is filled to the level indicated by line 124, with a low viscosity oil such as automatic transmission fluid. A fluid inlet passage 126 defined between shroud 92 and an adjacent interior wall portion 46b of member 46 supplies fluid to working chamber 102 from the fluid reservoir; the reservoir fluid enters the working chamber 102 adjacent gap portion 110a. The construction of impeller blades 76 is such that rotation of the impeller accelerates fluid in the working chamber 102 radially outward from the edge portions 80a. Gap portion 110a adjacent edges 80a constitutes a fluid inlet for the impeller, both for toroidally circulating fluid within the working chamber and for makeup fluid entering through passage 126 to replace fluid leakage occurring at gap portion 110b. Hence, the area adjacent edges 80a is a low pressure area which provides suction to draw makeup fluid through inlet passage 126 and into the working chamber 102. The described reservoir and makeup fluid arrangement provides total immersion of the turbine and impeller members in oil, prevents air from being sucked downward along the inner and outer diameters of shaft 22 by the suction from passage 126, provides room for fluid expansion, and provides lubrication for sleeve bearing 24 and the gears in chamber 12.

Referring now to FIGS. 1A-3, impeller 38 includes pockets 128 defined between adjacent impeller blades 76 and the adjacent portion of trough 74. When the impeller member is rotated impeller blades 76 impart an energy velocity to the fluid in pockets 128, thereby establishing a radially outward fluid flow. The smooth, curved surface of trough 74 guides the flow and changes its direction to a radially inward flow which exits the impeller at edge portion 80b, passes through gap portion 110b, and enters the turbine at edge portion 108b with minimum energy velocity losses. The fluid upon being directed into the turbine enters pockets 130 defined between adjacent turbine blades 104 and the adjacent portion of trough 100. The fluid flowing through the turbine gives up energy velocity and imparts a torque to the turbine while being guided by the smooth, curved surface of trough 100. Trough 100 changes the radially inward flow to a radially outward flow which exits the turbine at edge portion 108a, passes through gap portion 110a, and reenters the impeller at edge portion 80a.

Figure 2:
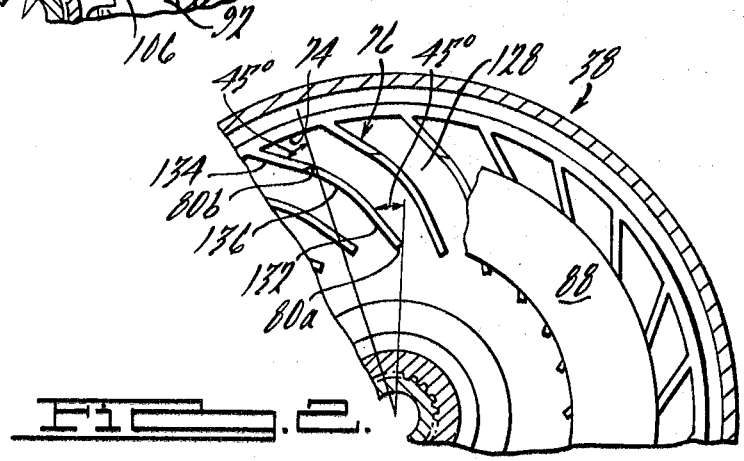
FIG. 2 is a reduced, fragmentary view of the impeller of the coupling shown in FIG. 1, looking in the direction of the arrow 2 in FIG. 1.

Referring now to the bottom view of the impeller member 38 in FIG. 2, the core guide ring 88 is shown partially broken away to illustrate the impeller blade construction. Each impeller blade 76 has a straight portion 132 beginning at blade edge 80a, portion 132 makes a 45° angle with a radius line drawn to edge 80a. A second straight portion 134 begins at blade edge 80b and extends to the outer circumferential surface of trough surface 74; portion 134 also makes a 45° angle with a second radius line drawn to edge 80b. The straight blade portions 132, 134 are joined by a smooth, curved blade portion 136 which functions to minimize turbulence of the fluid flowing over the blade from the inlet to the outlet.

Figure 3:
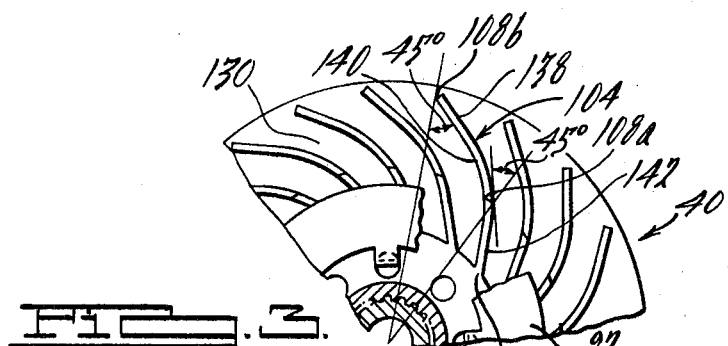
FIG. 3 is a reduced, fragmentary view of the turbine of the coupling shown in FIG. 1, looking in the direction of the arrow 3 in FIG. 1.

Referring now to the top view of the turbine member 40 in FIG. 3, shroud 92 is partially broken away to reveal the turbine blade construction. The construction of turbine blades 104 is similar to the described construction of impeller blades 76. Each turbine blade 104 has a straight portion 138, beginning at blade edge portion 108b; blade portion 138 makes a 45° angle to a radius line drawn to edge 108b. Straight edge portion 138 transitions into a curved portion 140 and then back to a straight portion 142 at a point about midway between a blade edge portion 108a and the radially innermost extent of curved edge 106. A tangent line drawn to curved portion 140 at edge portion 108a makes a 45° angle with a radius line drawn to edge portion 108a.

The above impeller and turbine construction allows a coplanar relationship between the impeller and turbine blades exits and entrances as the impeller blades pass the turbine blades. This allows fluid to flow smoothly from the impeller to the turbine, or vice versa, with a minimum of turbulence. The torque transmitting capacity of a fluid coupling increases with mass circulatory velocity of the fluid within the toroidal circuit and mass circulatory velocity is decreased by turbulence in the toroidal circuit. The described coplanar relationship between the impeller and turbine blade exits and entrances therefore contributes importantly to the torque transmitting capacity of the coupling.

When control sleeve 42a is withdrawn from gap 110b by moving control arm 114 downward, rotation of impeller member 38 creates a circulatory movement of fluid in impeller pockets 128 in the radially outward direction indicated by arrow A in FIG. 1A. Circulation is always in this direction and is due to the difference in radius between the inlets and outlets of impeller blades 76.

OPERATION

The coupling embodied in the transmission of FIG. 1 is designed for serial connection between a prime mover, such as a piston or turbine engine, and a load. The connection to the load may be through a gear mechanism, as shown, or may be direct. The coupling input shaft 18 may be directly connected to a prime mover output shaft or may be driven thereby through a fixed or variable ratio drive arrangement.

With control sleeve portion 42a withdrawn from gap 110b, rotation of impeller member 38 causes impeller blades 76 to impart a centrifugal force on the fluid in pockets 128 due to the difference in radius between the inlet and outlet edges of the impeller blades. This force establishes a toroidal fluid circulation in working chamber 102 in the direction of the arrow A in FIG. 1A. The curvature of trough 74 smoothly redirects the radially outward flow to a radially inward flow which is substantially perpendicular to the gap portion 110b as the fluid flows into the turbine member 40. The fluid flowing through the turbine imparts a torque thereto while being redirected to a radially outward flow which circulates back to the impeller. Continued rotation of the impeller reaccelerates the fluid to maintain a toroidal fluid flow within the working chamber 102.

In general, torque transmission through a hydrokinetic coupling increases with increasing mass circulatory flow in the fluid working chamber, reaching a maximum for any given size coupling and impeller speed when the turbine is stalled. Conversely, increasing turbine speed results in decreasing mass circulatory flow in the fluid working chamber and increases coupling efficiency. Hence, to vary the torque transmission through a coupling for a given turbine load, the mass circulatory flow in the fluid working chamber must be varied. This can be accomplished by varying the impeller speed.

Control sleeve portion 42a provides a means for controlling the torque transmitting capacity of coupling 16 by throttling the mass circulatory flow in working chamber 102 independent of turbine load and impeller speed. Tests of coupling 16 have shown a substantially linear correlation between the percentage insertion of sleeve portion 42a into gap portion 110b and the percentage torque reduction of the coupling, i.e., 50 percent insertion produces a torque reduction of about 50 and 100 percent insertion produces a reduction of slightly less than 100 percent. At 100 percent insertion, small torques are transmitted to shaft 22 of the turbine member. However, these small torques are very low and within a range which indicates they are due to viscous drag. This very low torque transmission through coupling 16 is achieved by totally blocking direct and indirect fluid flow between impeller member 38 and turbine member 40. Direct fluid flow between the impeller and turbine members at 100 percent sleeve insertion is prevented by the sealing coaction between the free end of sleeve portion 42*a* and core guide ring 88. Indirect fluid flow would still occur between the turbine and the impeller if fluid were allowed to escape from the working chamber 102 through the annular gap 144 between the outer periphery of sleeve portion 42*a* and the adjacent annular surface on member 44; this escaping fluid would create a fluid movement through impeller member 38 which would establish a suction at gap portion 110*a* which would in turn draw fluid through makeup passage 126 and through an annular gap 146 between the inner periphery of sleeve portion 42*a* and the adjacent annular edge of turbine member portion 90*c*. This indirect fluid flow is prevented by split ring seal 118 which coacts with the outer periphery of sleeve portion 42*a* to seal gap 144.

The invention device will thus be seen to provide a hydrokinetic coupling which retains the superior energy transmitting characteristics of the conventional axially facing trough design and additionally provides torque regulating characteristics superior to the conventional axially facing design.

What is claimed is:

1. A hydrokinetic torque transfer device comprising:

A. a first member defining an annular trough concentric to an axis;
   B. a second member defining an annular trough concentric to said axis and confronting said first trough member in a manner defining a toroidal fluid chamber;
   C. means mounting at least one of said members for rotation about said axis;
   D. first and second sets of fluid directing blades circumferentially disposed respectively in the troughs of said members in a manner defining an annular gap between said blade sets;
   E. means for rotatively driving one of said members to circulate fluid from the trough of said one member to the trough of said other member, thereby creating a toroidal fluid flow in said chamber;
   F. means movable into said gap for blocking fluid circulation from the trough of the driven member to the trough of said other member; and
   G. a seal cooperating with one of said members and said blocking means to impede fluid circulation in the trough of at least one of said members when said blocking means is moved into said gap.

2. The transfer device of claim 1, wherein:

H. said first member defines a radially inwardly opening trough;
   I. said second member defines a radially outwardly opening trough confronting the trough of said first member;
   J. said annular gap defined by said blade sets includes a cylindrical gap portion;
   K. said blocking means is a cylindrical sleeve movable into and out of said gap portion; and
   L. said seal is an annular seal interposed between one of said members and said sleeve.

3. The transfer device of claim 2, wherein:

M. one of said members includes an annular wall portion
      1. concentric to said sleeve, and
      2. having an annular groove concentric to said sleeve; and
   N. said annular seal is positioned in said groove.

4. The transfer device of claim 3, wherein:

O. said seal is a split seal.

5. The transfer device of claim 3, wherein:

O. said member including said annular wall portion is said driven member.

6. The transfer device of claim 5, wherein:

P. said driven member is said first member.

7. A hydrokinetic torque transfer device comprising:

A. a first member defining an annular, radially inwardly opening trough concentric to an axis;
   B. a second member defining an annular, radially outwardly opening trough disposed concentrically within and in confronting relation to said inwardly opening trough to define therewith a toroidal fluid working chamber;
   C. means for rotatively driving one of said members about said axis;
   D. first and second sets of fluid directing blades circumferentially disposed, respectively, in said inwardly and outwardly opening troughs in a manner defining an annular stepped gap between mutually facing edges of said first and second blade sets, said stepped gap having an annular gap portion parallel to said axis and an annular gap portion transverse to said axis;
   E. a core guide ring disposed in said transverse portion, and fixed to one of said blade sets; and
   F. a cylindrical control sleeve
      1. slideable into and out of said parallel gap portion,
      2. having an end cooperable with said guide ring to form a seal for blocking direct fluid circulation between said first and second blade sets, and
      3. having a wall thickness less than the thickness of said gap, thereby defining running clearance gaps between said sleeve, said first and second members, and said blade sets, and
   G. seal means cooperating with one of said members and said sleeve to impede fluid circulation through at least one of said running clearance gaps when said sleeve blocks direct fluid circulation between said first and second blade sets.

8. The transfer device of claim 7, wherein:

H. said seal cooperates with said driven member and said sleeve.

9. The transfer device of claim 8, wherein:

I. said first member
      1. is said driven member, and
      2. includes an annular wall portion
         a. concentrically surrounding said sleeve, and
         b. having an annular groove concentric to said sleeve;
   J. said seal is an annular seal positioned in said groove.

* * * * *